US009344348B2

(12) United States Patent
Ivanov et al.

(10) Patent No.: US 9,344,348 B2
(45) Date of Patent: May 17, 2016

(54) MANAGING THE QUALITY OF SERVICE LEVELS (QOS) OF NETWORK TRAFFIC

(75) Inventors: Anton Radostinovinch Ivanov, London (GB); Thomas David Nadeau, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 294 days.

(21) Appl. No.: 13/877,255

(22) PCT Filed: Sep. 9, 2011

(86) PCT No.: PCT/GB2011/001332
§ 371 (c)(1),
(2), (4) Date: Apr. 1, 2013

(87) PCT Pub. No.: WO2012/042190
PCT Pub. Date: Apr. 5, 2012

(65) Prior Publication Data
US 2013/0191537 A1    Jul. 25, 2013

(30) Foreign Application Priority Data

Sep. 30, 2010   (EP) .................................... 10251702

(51) Int. Cl.
*H04L 12/26*         (2006.01)
*H04L 29/12*         (2006.01)
(Continued)

(52) U.S. Cl.
CPC ...... *H04L 43/0876* (2013.01); *H04L 29/12066* (2013.01); *H04L 29/12783* (2013.01); *H04L 47/10* (2013.01); *H04L 47/2408* (2013.01); *H04L 61/1511* (2013.01); *H04L 61/35* (2013.01)

(58) Field of Classification Search
CPC ................... H04L 43/0876; H04L 29/12066; H04L 29/12783; H04L 61/1511; H04L 61/35
See application file for complete search history.

(56) References Cited

U.S. PATENT DOCUMENTS 6,718,380 B1 *  4/2004  Mohaban et al. .............. 709/223
6,909,726 B1 *  6/2005  Sheeran .............. H04L 12/2801
                                                    370/395.41

(Continued)

FOREIGN PATENT DOCUMENTS

EP       0 817 444      1/1998
WO       00/30401       5/2000

OTHER PUBLICATIONS

Kille et al., *RFC 2247—Using domains in LDAP-X_500 Distinguished Names—The RFC Archive.txt*, Network Working Group, Request for comments: 2247, Category: Standards Track, Jan. 1998 (6 pgs.).

(Continued)

*Primary Examiner* — Jimmy H Tran
(74) *Attorney, Agent, or Firm* — Nixon & Vanderhye P.C.

(57) ABSTRACT

A network element and method for marking traffic in a packet-switched data network which comprises a distributed hierarchical naming system and the network element. The network element comprises a marking rule store for storing marking rules, in which each marking rule is indicative of a quality of service level allocated to traffic on a connection impinging on the network element. The network element derives from the distributed hierarchical naming system quality of service level data for a connection, stores in the marking rule store a marking rule for the connection based on the retrieved quality of service level data and marks traffic on the connection in accordance with the marking rule.

2 Claims, 6 Drawing Sheets

(51) Int. Cl.
*H04L 12/801* (2013.01)
*H04L 12/851* (2013.01)

(56) References Cited

U.S. PATENT DOCUMENTS

| | | | | |
|---|---|---|---|---|
| 7,092,356 | B2* | 8/2006 | Rabie | H04L 12/5602 370/230 |
| 7,376,130 | B2* | 5/2008 | Farmwald | H04L 12/2856 370/352 |
| 7,512,683 | B2* | 3/2009 | Anschutz et al. | 709/226 |
| 7,584,294 | B2* | 9/2009 | Plamondon | 709/233 |
| 8,284,779 | B2* | 10/2012 | Sakata et al. | 370/395.21 |
| 8,300,541 | B2* | 10/2012 | Cholas et al. | 370/252 |
| 2002/0087707 | A1* | 7/2002 | Stewart et al. | 709/230 |
| 2003/0112755 | A1* | 6/2003 | McDysan | 370/230 |
| 2007/0094691 | A1* | 4/2007 | Gazdzinski | H04N 7/17318 725/62 |
| 2007/0217436 | A1* | 9/2007 | Markley | H04L 12/2803 370/401 |
| 2008/0228864 | A1* | 9/2008 | Plamondon | G06F 17/30902 709/203 |
| 2009/0147792 | A1* | 6/2009 | Anschutz et al. | 370/395.21 |
| 2009/0207866 | A1* | 8/2009 | Cholas et al. | 370/505 |
| 2010/0034088 | A1* | 2/2010 | Sakata et al. | 370/235 |
| 2010/0269146 | A1* | 10/2010 | Britt | H04N 7/1675 725/110 |

OTHER PUBLICATIONS

Classless Inter-Domain Routing, from Wikipedia, the free encyclopedia (Redirected from CIDR), retrieved from: http://en.wikipedia.org/wiki/CIDR on Aug. 16, 2010 (6 pgs.).
International Search Report for PCT/GB2011/001332, mailed Jan. 19, 2012.
Kille Isode Ltd. et al., "Using Domains in LDAP/X.500 Distinguished Names; rfc2247.txt.", IETF Standard, (Jan. 1, 1998), p. 2, paragraph 1.

* cited by examiner

MANAGING THE QUALITY OF SERVICE LEVELS (QOS) OF NETWORK TRAFFIC

This application is the U.S. national phase of International Application No. PCT/GB2011/001332, filed 9 Sep. 2011, which designated the U.S. and claims priority to EP Application No. 10251702.6, filed 30 Sep. 2010, the entire contents of each of which are hereby incorporated by reference.

The invention is directed to communication networks in general and to managing the quality of service levels (QoS) of network traffic that utilizes such networks.

We use QoS or "quality of service level" to denote a predictable service level provided to traffic in a data network and measured in relation to such parameters as bandwidth, jitter and delay. In today's communication networks, most services such as voice, video, and data utilize an IP-based transport. Use of a packet-switched network such as an IP network, as opposed to a dedicated circuit-switched one, greatly reduces the cost to the operator while, at the same time, facilitating the provision of new and innovative services for the consumer. However, the use of a shared medium such as a packet-switched network brings with it the problem of managing the QoS for the different types of traffic sharing the network.

TECHNICAL BACKGROUND

QoS Control in a Packet Switched Network

One means to control QoS in a packet switched network is to mark each packet with a specific quality of service level and to allocate traffic in each quality of service level to a different queue following a set of rules which is usually called a "queuing discipline". Most queuing disciplines specify a priority and a bandwidth for each queue as the means to exercise control.

Marking is usually performed when the packet enters into the network or administrative domain, i.e. at a network or domain boundary node. From there on the marking is usually trusted until the packet leaves the network. The routers in the network perform policing by queuing all packets they receive with a specific marking (i.e. a relating to a specific quality of service level) into a designated queue prior to transmitting them to the next hop. The sizes of the queues as well as the priority associated with each queue may be derived from network capacity and planning rules and, in most networks, remain static over a long period of time. Between three and six quality of service levels are normally supported.

Classifying traffic remains one of the hardest problems related to QoS in a modern network.

In most cases traffic for a service can be easily identified by a combination of destination IP address, protocol, port number and type of service. These combinations are either known due to services being well known (i.e.: part of standard protocols), or are defined a priori by either operators or users. Some services may need application-aware firewall modules (sometimes referred to as "Layer 4" or "Layer 7" filtering) to identify them correctly.

Customer Premises Equipment

The customer premises equipment (CPE) forms an interface or point of access between an external communications network (such as the Internet) and customer terminal equipment such as network-enabled computing devices located at the customer's premises. The latter customer terminal equipment may be thought of as constituting a user network, although various devices in the same user network may, in some cases, not communicate via the user network with each other but only with the CPE. The CPE enables Internet access for the customer terminal equipment. Depending on the access network used by the telecommunications provider CPE may connect to a PSTN/DSL network, (G)PON, Cable, WiMax, etc. In enabling Internet access, CPE commonly performs at least one of the following functions: either network address translation (NAT) for IPv4 or stateful firewall for either IPv4 or IPv6.

In the NAT case the source IP address of each new connection from consumer terminal equipment in the user network is rewritten to make it look like the connection is originating from CPE, rather than from the consumer terminal equipment. In order to achieve this, CPE maintains an internal state table for all live connections. Any incoming packet is matched against the connections in the state table and its destination IP address is rewritten to the address of the consumer terminal equipment indicated for that connection. Linux, BSD and nearly all other operating systems used for CPEs provide an API to access this state table from additional software applications (or agents) loaded for execution on the same CPE.

In the IPv4/v6 stateful firewall case, a similar state table is maintained on CPE for all connections that have been allowed to/from the consumer terminal equipment. As in the NAT case, under most operating systems used for CPEs this table is available for use by additional software applications.

A problem with currently-deployed CPEs is that, in most modern broadband networks, CPE does not mark the traffic and, as a result, no QoS scheme is implemented for the hop between CPE and the Broadband Remote Access Server (BRAS). As a result, there are multiple scenarios in which one application using a network connection could adversely affect the user experience deriving from other applications using the same network connection and even the user experience of users using other network connections. Operation of currently-deployed CPEs will now be described with reference to the conventional ISP Access Network of FIG. 1.

FIG. 1 shows CPEs $10a$, $10b$, $10c$, connecting customer premises equipment $12a$, $12b$ $12c$, $12d$ via ISP access network 14. ISP access network 14 comprises of plurality of access concentrators represented by access concentrators $130a$ and $130b$ and a plurality of access servers represented by access server 132. ISP access network 14 provides access to deep packet inspection (DPI) server 134. Access is provided between DPI server 134 and internet 16 via router 136. An example of forming a connection between two devices served by the same ISP access network will now be described with reference to FIG. 1. A user of user network terminal $12b$, for example a personal computer with network interface intends to communicate with a user of user network terminal $12d$. Terminal $12b$ is connected via CPE $10b$ to access to controller $130a$ in ISP access network 14 whereas terminal $12d$ is connected by CPE $10c$ to access concentrator $130b$ also in ISP access network 14.

Currently, the primary means for managing QoS in an IP network is deep packet inspection (DPI). Traffic between access concentrators $130a$ and $130b$ is exchanged via access server 132, however, in order to police QoS for this traffic, it is necessary to divert the traffic flowing between access concentrators $130a$ and $130b$ further into the network to DPI 134. This may involve a significant additional cost in terms of complexity, hardware and operational costs. Reliance on DPI requires that all traffic be brought to a DPI device in order for it to be classified into the correct QoS category—often requiring a significant detour across the network to reach the DPI device (as illustrated in FIG. 1). This is the case whether a single DPI instance is employed, or a distributed DPI infrastructure is used. CPEs 10 in FIG. 1 are unable to police QoS on traffic passing through them. Taking traffic flowing from terminal 12*d* to terminal 12*b* as an example, traffic flowing from terminal 12*d* through CPE 10*c*, access concentrator 130*b* to access server 132 is not policed. Between CPE 10*c* and access concentrator 130*b*, the unpoliced traffic experiences contention, thus raising the possibility that the service levels achieved will not be sufficient to provide an adequate user experience. In order to determine the appropriate QoS, the traffic from terminal 12*d* is diverted to DPI 134, where the contents of the packets are inspected and a decision made on QoS based on the type of traffic being carried in the packets. The marked traffic is returned from DPI 134 to access server 132 from where it continues via access concentrator 130*a* and CPE 10*b* to terminal 12*b*. As the traffic between DPI 134 and terminal 12*b* has been marked for QoS, it is now policed on its journey between DPI 134 and CPE 10*b* but not when travelling between CPE 10*b* and terminal 12*b*, as CPE 10*b* does not have the capability for policing the traffic.

There is therefore a need for efficient marking system suitable for but not limited to implementation in equipment, such as CPE, located at the boundary of a domain of a packet-switched data network.

SUMMARY

The invention provides an arrangement for marking traffic for quality of service in a packet-switched data network that addresses at least some of the problems outlined above in relation to existing network quality of service marking systems.

A network element for a packet-switched data network is provided. The network element comprises a marking rule store for storing marking rules, in which a marking rule is indicative of a quality of service level allocated to a connection impinging on the network element. The network element derives from a distributed hierarchical naming system—comprised in the packet-switched data network—quality of service level data for a connection impinging on the network element. The network element stores in the marking rule store a marking rule for the connection based on the retrieved quality of service level data; and marks traffic on the connection in accordance with the marking rule.

According to a preferred embodiment, new connections are detected and marking rules established for them. According to this embodiment, the network element also comprises a connection state store; for storing connection state information and comprising a number of entries; in which each entry comprises information relating to the state of a connection impinging on the network element. The network element scans the connection state store to identify an entry corresponding to a new connection impinging on the network element. On detecting such an entry, the network element derives from the distributed hierarchical naming system quality of service level data for the new connection; and stores in the marking rule store a marking rule for the new connection based on the retrieved quality of service level data.

According to a further preferred embodiment, the quality of service level data for the connection comprises quality of service level data corresponding to at least one network of the connection, and a series of queries are sent in succession to the distributed hierarchical naming system to derive quality of service level data corresponding to at least one network of the connection; in which each one of the series of successive queries is associated with a masked form of the address of the connection.

According to a further preferred embodiment, new connections are allocated an initial quality of service level marking prior to deriving quality of service level data for the new connection.

According to a further preferred embodiment, the network element caches locally data obtained from the distributed hierarchical naming system.

According to a further preferred embodiment, quality of service level data is derived from the distributed hierarchical naming system by retrieving the quality of service level data from a server pointed to by the distributed hierarchical naming system.

BRIEF DESCRIPTION OF THE DRAWINGS

Embodiment of the invention will now be described by way of example only, with reference to the accompanying drawings in which.

DETAILED DESCRIPTION OF PRESENT EXAMPLE EMBODIMENTS

The invention will now be described by way of example with reference to a CPE, although it will be understood that the invention is not limited to use with CPE but may operate with any form of network switching, routing or similar equipment that has access to DNS or similar distributed hierarchical naming system. The invention provides an efficient way of obtaining and using at a network element, data specifying a quality of service level for traffic impinging on the network element. We use the term "impinging" to indicate traffic arriving at or leaving the network element. The traffic may be on a connection originating or terminating at the network element or passing through it. The invention is particularly useful when applied to a CPE, which conventionally has no mechanism for marking traffic in this way.

The invention provides a method for configuring a network element (e.g. CPE, router, switch, or similar device) to classify traffic for QoS purposes. The network element is comprised in a packet-switched data network, together with a distributed hierarchical naming system (for example DNS). The network element stores marking rules for connections based on QoS data derived from the distributed hierarchical naming system, each marking rule being indicative of a quality of service level allocated to traffic on a connection impinging on the network element. The network element marks traffic on the connection in accordance with the marking rule. Use of the distributed hierarchical naming system removes the need for deep packet inspection in order to determine the appropriate QoS marking for packets on a connection. The QoS data may comprise information from which marking rules may be generated or, alternatively, the marking rules themselves.

Figure 1:
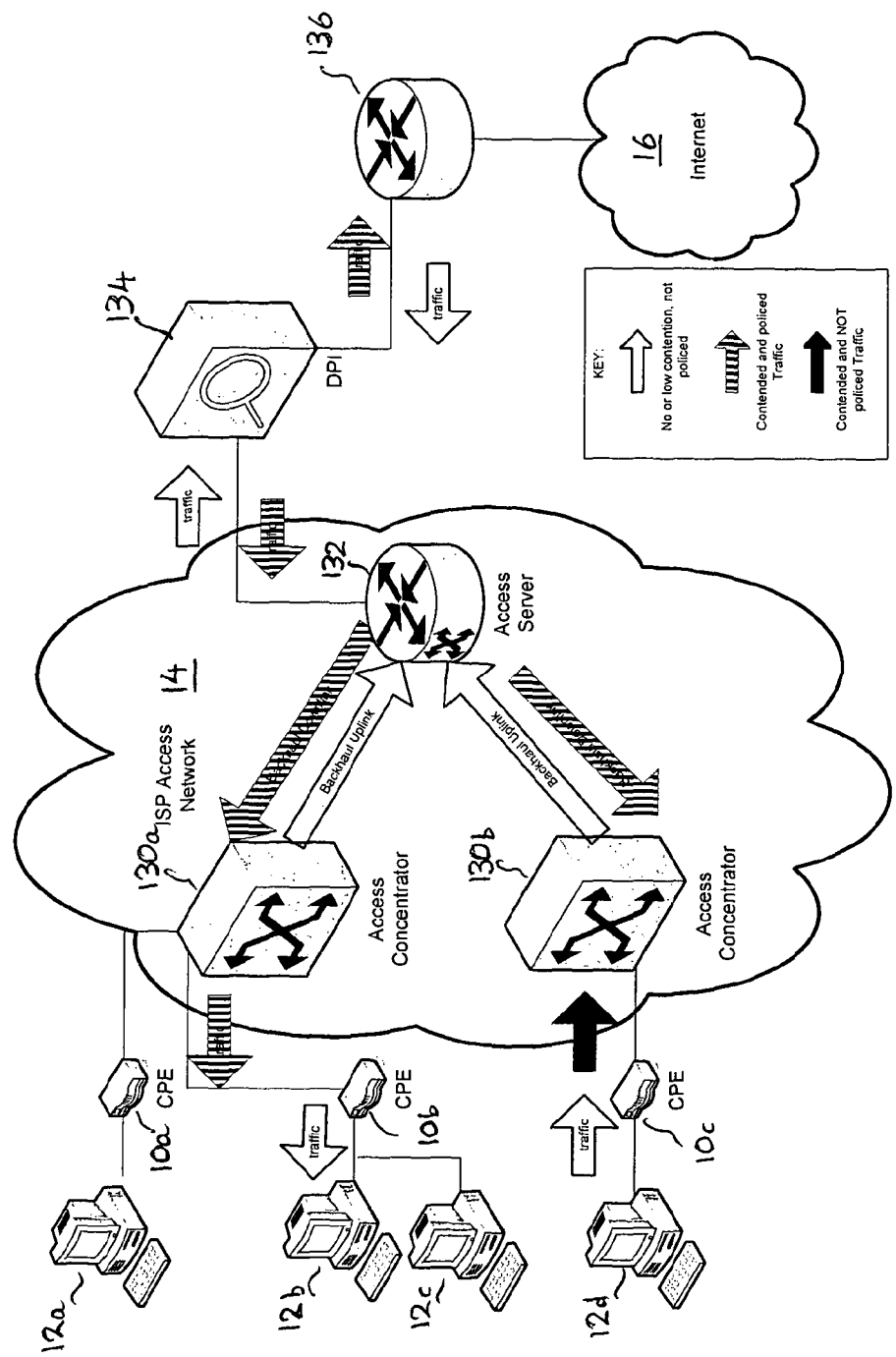
FIG. 1 shows a schematic block diagram of a user access network indicating operation of the prior art.
Figure 2:
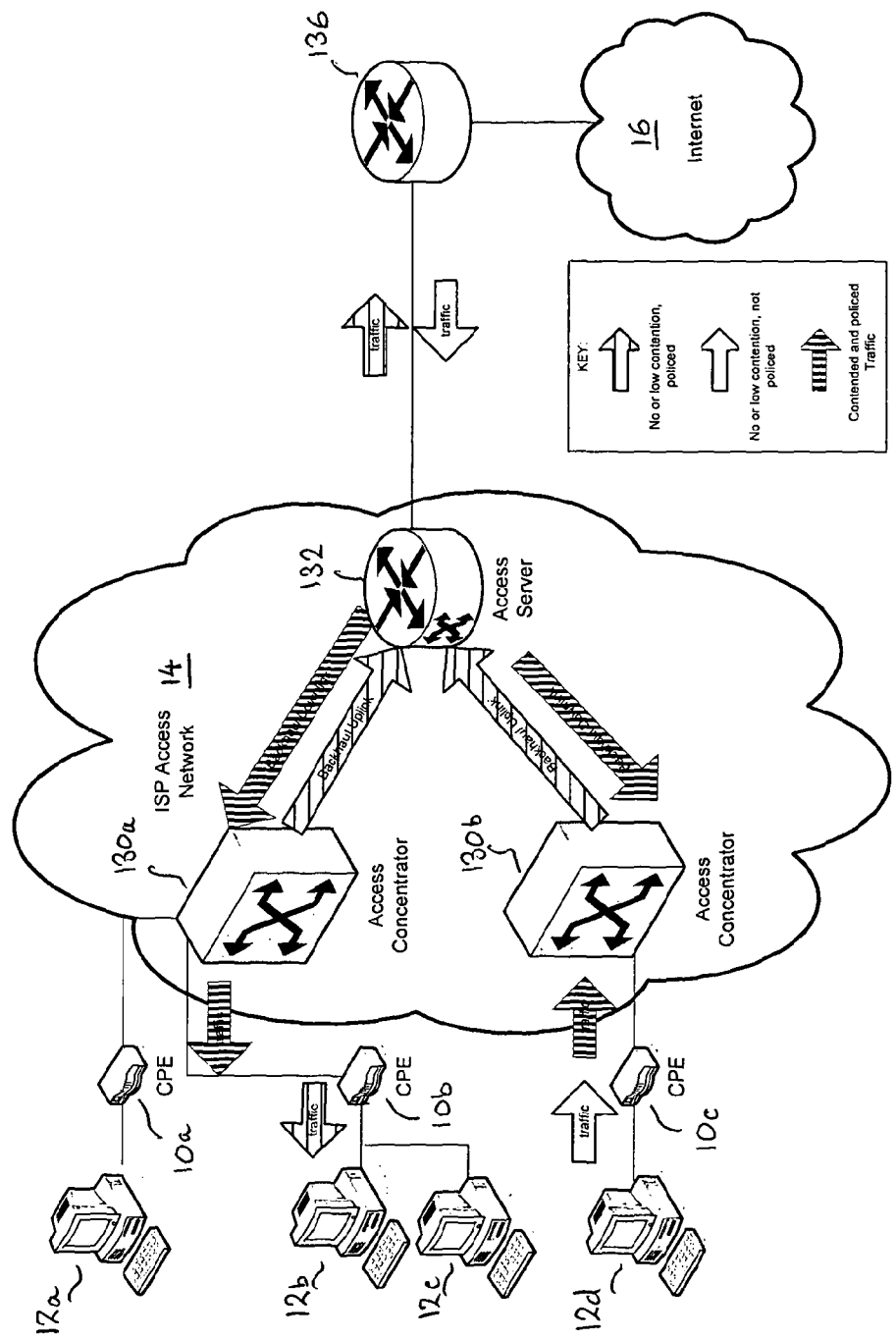
FIG. 2 shows a schematic block diagram of a user access network indicating operation according to the invention.

FIG. 2 shows the plurality of CPEs 10 and other elements of FIG. 1 now operating according to an embodiment of the invention. Access is provided between ISP access network 14 and internet 16 via router 136. Notably, DPI 134 shown in FIG. 1, is not required for operation of the invention. Traffic between access concentrators 130a and 130b is exchanged, as before, via access server 132, however, this traffic is no longer diverted across the network to a DPI server, as CPEs 10a, 10b, 10c according to the invention now have the ability, not only to police QoS on traffic passing through them but to mark traffic for QoS. Taking traffic flowing from terminal 12d to terminal 12b as an example, traffic flowing from terminal 12d to CPE 10c is not policed, however, traffic flowing from CPE 10c via access concentrator 130b to access server 132 can now be policed. As the traffic has been marked for QoS by CPE 10c, it is now policed on its journey between CPE 10c and destination terminal 12b.

Figure 3:
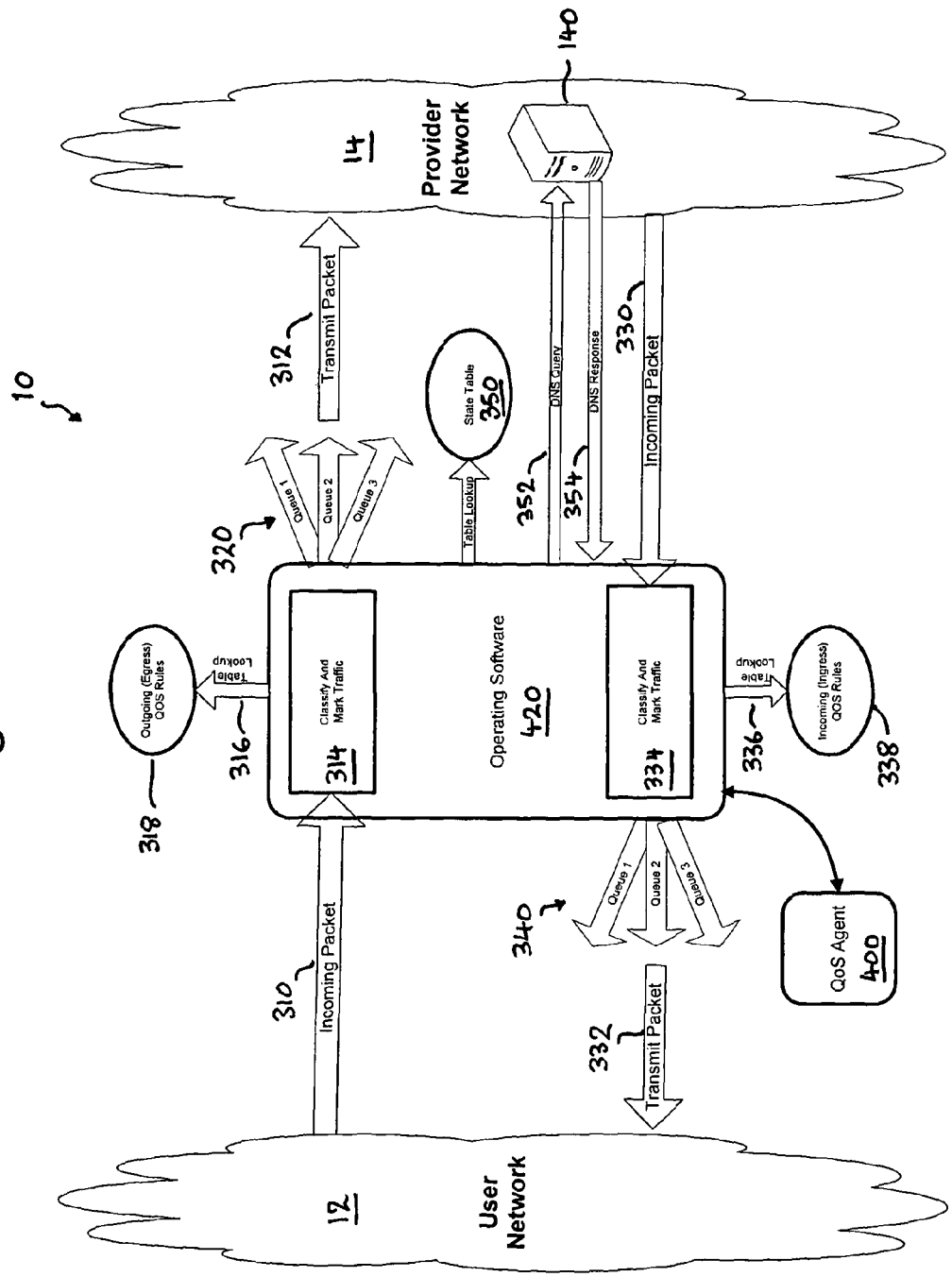
FIG. 3 shows a schematic block diagram of a CPE according to the invention.

According to an embodiment, entries denoting QoS may be provided in a marking store or state table, e.g. in FIG. 3, outgoing QoS rules table 318 and incoming QoS rules table 338 on a CPE 10 or, alternatively, special entries may be provided in a normal CPE 10 state table 350. According to a further embodiment, an internal marking scheme to denote QoS may be used where policing is carried out internally to CPE 10, so that the rest of the network largely relies on policing effected by CPE 10 and does not need to understand the marking scheme. The actual location used will depend on the operating system. The quality of service may, in this way, be indicated for each connection that has an entry in the relevant table. CPE 10 can use the information contained in the quality of service entries to mark packets with a specific quality of service class when policing outgoing 310 and/or incoming 330 traffic on each connection. It is possible to apply the invention both to networks using IP DiffServ (marking diffserv bits with quality of service), Ethernet (marking class of service (CoS) p-bits) or another per-packet marking as used in the access technology. In the former case, CPE 10 overwrites the DiffServ bits in the IP header with the bits signifying the correct quality of service class. In the latter case, CPE 10 writes the correct p-bits into the tag of the Ethernet frame.

Once the traffic has been marked, CPE 10 may direct traffic to the correct QoS queue 320, 340 where it is metered and transmitted according to the QoS scheme provisioned on CPE 10. This ensures that the amount of traffic entering or leaving CPE 10 for each quality of service class conforms to the rules specified by an operator of the packet-switched data network 16.

Domain Name Service

Domain Name Service (DNS) was one of the first services established on the Internet, DNS is a well-understood, resilient, scalable and reliable caching and distribution system. DNS works by mapping human-readable domain names such as "www.bt.com" to IP addresses such as "192.168.1.1" and vice versa. DNS servers are configured as a distributed hierarchy of servers with a well-defined precedence. The procedure for making a DNS query provides a well-defined set of semantics for caching data on any particular server visited along the path of servers making up the hierarchy, as well as on the client making the query. The Sender Policy Framework (now standardised as RFC 4408 "Sender Policy Framework (SPF) for Authorizing Use of Domains in E-Mail, Version 1", IETF, April 2006) was developed in the late 1990s. This scheme uses a form of XML encoding to provide a list of acceptable mail relays for a domain and is an example how arbitrary data can be encoded in DNS.

Operation

Most traffic may be identified for QoS purposes by processing information comprised in packet headers, such as destination, IP version, port, type of service and/or application Other ways of identifying traffic include the use of extensions which fall back to Common Open Policy Service (COPS) as defined by RFC 2748 "The COPS (Common Open Policy Service) Protocol", IETF, January 2000 or another high-end QoS policy representation.

The normal NAT and stateful firewall functionality of CPE 10, as described above, is preferably unaffected by the invention. In addition to the normal functionality, a hierarchy of queues and a hierarchy of policers are introduced on each CPE.

FIG. 3 shows a schematic representation of a CPE according to the present invention. According to an embodiment, an agent application 400 may be added to CPE 10 to interwork with operating software 420. Agent 400 may comprise a kernel or user space application (e.g. a divert socket application in Berkeley Software Distribution or a L7 filter application in Linux). Agent 400 is operable to instruct operating software 420 periodically to scan the NAT/stateful firewall state tables 350, as appropriate, for new connections. When a new connection is found in a state table, agent 400 instructs operating software 420 to attempt 352, 354 to retrieve QoS data for the new connection from DNS 140 by using packet header information, e.g. the destination network address associated with the entry as an argument to a DNS query 352. When QoS data is retrieved 354 from DNS 140 in this way, agent 400 instructs operating software 420 to use the retrieved QoS data to add a new marking rule to the appropriate marking state table 318, 338 that correctly characterises the appropriate QoS for the traffic for the new connection.

As represented previously, CPE 10 (which corresponds with any of CPE 10a, 10b or 10c in FIG. 2) is situated between user network 12 and ISP access network or provider network 14. QoS agent 400, comprised in CPE 10, interworks with operating software 420 to interface with outgoing QoS rules table 318, state table 350 incoming QoS rules table 338 (all of which are comprised in CPE 10) and DNS server 140 comprised in provider network 14. FIG. 3 shows CPE 10 accepting incoming packets 310 from User Network 12 and processing them to generate transmit packets 312 to provider network 14. FIG. 3 also represents movement of packets in the opposite direction, i.e. receiving incoming packets 330 from provider network 14 and processing these packets to generate transmit packets 332 to user network 12. We now describe the processing of packets received from user network 12 in more details. An incoming packet 310 will be passed to classify and mark traffic module 314, part of operating software 420. Classify and mark traffic module 314 carries out a table look up 316 to access outgoing (egress) QoS rules 318. In the opposite direction incoming packet 330 is input to classify and mark traffic module 334 which carries out a table look up 336 to incoming (egress) QoS rules table 338.

Figure 4:
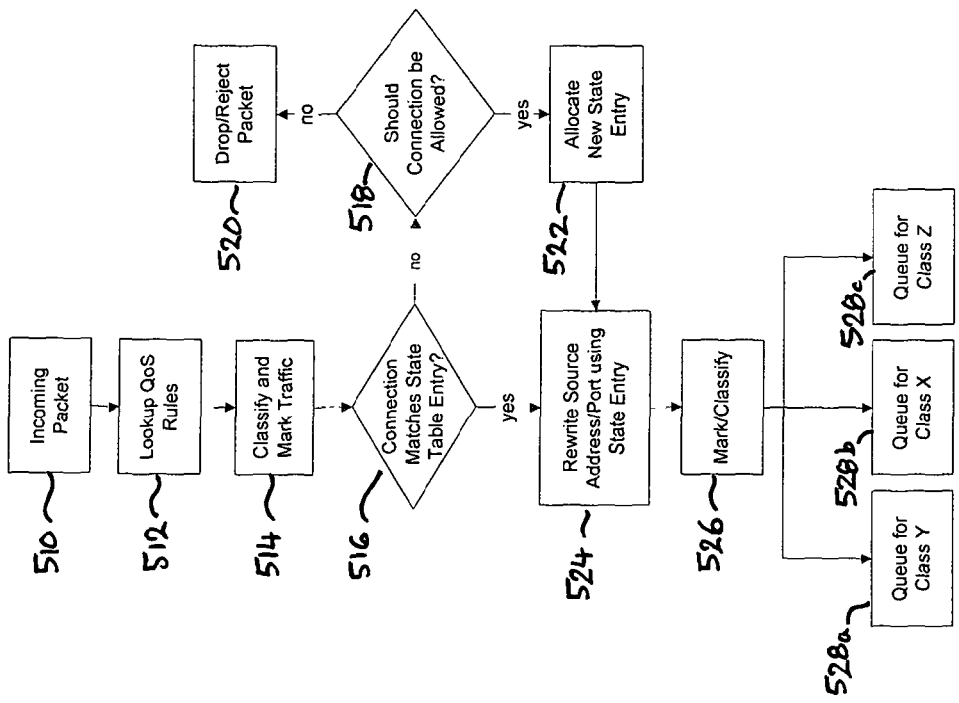
FIGS. 4, 5 and 6 show operation of a CPE according to the invention.

The operation of an example of agent 400 according to a preferred embodiment of the invention will now be described with reference to the flow chart of FIG. 4. At 510 an incoming packet is detected and at 512 the appropriate marking state table 318, 338 (i.e. depending on the direction of the detected packet: from access network 14 towards user network 12, or vice versa) is consulted to check whether the incoming packet relates to a connection for which a QoS rule is present in the appropriate marking state table. If a rule is found, the packet is marked accordingly to indicate the quality of service to be assigned to the connection or network of the detected packet.

At 516, state table 350 is searched to check for an entry for the connection or network of the detected packet. This is done to detect whether the packet relates to an existing connection or a new connection for the CPE. If no corresponding connection entry is found in the state table, a decision is made at

518 whether to allow a connection to be created or not. If it is decided not to allow creation of the connection the packet is dropped at 520. If it is decided to allowed creation of a connection, a NAT mapping (IPv4) or a stateful firewall mapping (IPv6) is added at 522 to state table 350. If the result of decision 516 is that a connection relating to the incoming packet is located in state table 350, then NAT (IPv4) or stateful firewall (IPv6) is consulted and, at 524, the header of the detected packet re-written according to indication found in state table 350 and the packet is allocated to the appropriate queue 528a, 528b, 528c, according to the QoS marking allocated to the packet at step 514, as described above.

According to the invention CPEs in the network may be modified to run an extra agent application (not shown) that is able to identity new connections, for example by instructing operating software 420 to scan the NAT/stateful firewall state table 350 periodically or based on interrupts triggered upon an entry being modified. Upon identifying each new connection, the operating software 420 retrieves from the DNS marking rules, if available, for the new connection and adds rules to the state table to mark traffic accordingly.

According to a preferred embodiment, unused entries in the marking table may be pruned periodically, i.e. removing entries relating to connections that have not been used for a specified period. Preferably, agent 400 instructs operating software 420 to scans the marking state table to locate and delete orphan rules (i.e. rules with no corresponding state table rule). Such orphan rules can result if a connection is torn down.

Figure 5:
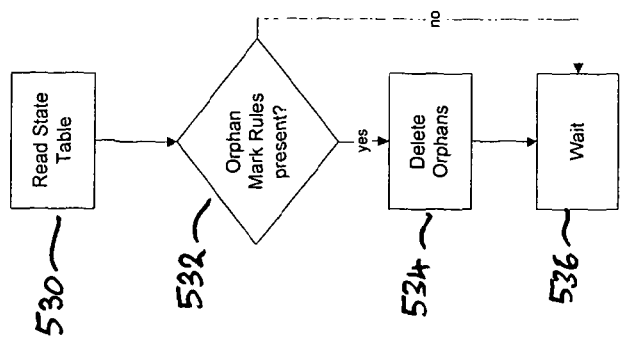

As shown in FIG. 5, further functionality according to embodiments of the present invention may be provided by CPE 10. FIG. 5 shows an extra process 532 to 536. A check is made at 532 whether any so-called "orphan" QoS rules (i.e. rules relating to a connection which does not have an entry in state table 350) are present in the relevant marking state table 318 or 338. If one or more orphan rules are detected at 532 they are deleted at 534. The sequence then waits at 536 until reactivated, either by detection of a new connection event or on elapse of a predetermined time period.

If there is no data in DNS 140 matching a query (resulting in the DNS server returning the code "NX-Domain" to indicate that the DNS has no entry for the specified address) agent 400 may instruct operating software 420 to, at least on a temporary basis, add to the appropriate marking state table 318, 338, a temporary, initial marking rule, as necessary, to characterises the QoS for the traffic for the new connection. It is also possible to apply settings for a network or subnetwork which contains the connection address instead of settings for a specific destination address, as described next.

Figure 6:
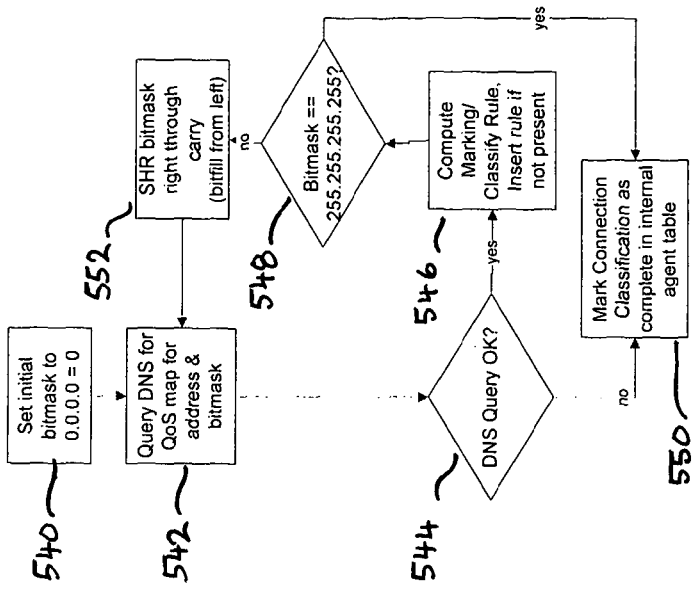

An alternative approach to retrieving from DNS QoS data for a connection is by querying DNS 140 for TXT records corresponding to the addresses of networks of a destination of the connection. As shown in FIG. 6, further functionality according to embodiments of the present invention may be provided by CPE 10. At 540 an initial bit mask is set to zero and, at 542, a DNS query for QoS marking is generated using the destination address of the incoming packet combined with the bit mask. At 544 a check is carried out on the response to the DNS query. If decision point 544 determines that the DNS query has not returned a valid result, for example a result of "NX-Domain" is received, the connection is marked at 550 as complete in the marking state table. If a response returning valid QoS data is received a corresponding marking rule is calculated at 546 and inserted in the relevant marking state table. At decision point 548, a check is made on the bit mask to see if the bit mask has reached a predetermined maximum value, e.g. 255.255.255.255 in IPv4. If the bit mask has reached this limit value, the connection is marked as complete in the marking state table at 550. If at 548 the bit mask is found not to have reached the maximum value, the bit mask is shifted at 552 right by one or more bit space whilst inserting "1" bits from the left so as to increase the number of ones in the bit mask. The DNS query 542 is then repeated with the new bit mask and the loop 542 to 552 repeated until broken by either of decision points 544, 548 to terminate at 550.

The further functionality illustrated in FIG. 6 is now described in more detail. Querying the DNS 140 for TXT records corresponding to the addresses of networks of a destination of the connection may involve starting with a DNS query quoting the destination address (e.g. 192.168.1.1 in IPv4 or 2001:DB8:0:0:8:800:200C:417A in IPv6) concatenated with the netmask to form, initially, the zero network address: 192.168.1.1/0 or 2001:DB8:0:0:8:800:200C:417A/0 and repeatedly querying the DNS, effectively adding, in each successive query, address bits present in the address of the connection starting from the most significant end by means of selecting the appropriate netmask to concatenate with the address. For example, 192.168.1.1/1 to form the network address 128.0.0.0 or 2001:DB8:0:0:8:800:200C:417A/1 to form the network address 2000::. In adding address bits, the address is progressively narrowed towards the actual destination address for the connection. Successive DNS queries are made in this way and the answers checked until a response of "NX-Domain" is received. Data comprised in the response to the immediately previous query may then represent QoS data for the network whose address was comprised in the immediately previous query and may be used to establish appropriate marking rules for the new connection. A further variant may involve starting with a DNS query quoting the zero network address to which one or more of the address bits present in the address of the connection have been added proceeding from the most significant bit.

A further approach to retrieving marking rules for a connection from DNS also involves querying the DNS for TXT records corresponding to the addresses of the networks of a destination of the connection. This further approach may involve starting with a DNS query quoting the complete destination address or an address based on the destination address but with one or more of the least-significant address bits masked out, e.g. replaced by bits set to a zero. This may involve starting with a DNS query quoting the destination address (e.g. 192.168.1.1 in IPv4 or 2001:DB8:0:0:8:800:200C:417A in IPv6) concatenated with a netmask, e.g: 192.168.1.1/31 to form the network address 192.168.1.0 or 2001:DB8:0:0:8:800:200C:417A/126 to form the network address 2000:DB8:0:0:8:800:200C:4178 and repeatedly querying the DNS, effectively removing, in each successive query, address bits present in the address of the connection starting from the least significant end by means of selecting the appropriate netmask to concatenate with the address. Where the initial query results in a response of "NX-Domain", the DNS is repeatedly queried. In each successive query, further address bits present in the address of the connection are replaced, proceeding from the least significant end, with bits set to the common value. In replacing address bits, the address is progressively broadened from the actual destination address for the connection to increasingly larger networks of the connection. In order to attempt to retrieve QoS data relevant to the connection, the DNS is repeatedly queried until either it receives an answer different from "NX-Domain" or all the address bits have been replaced with bits set to the common value.

Agent 400 instructs operating software 420 to use the QoS data retrieved from DNS 140 to add to the appropriate marking state table 318, 338, a marking rule that correctly characterises the appropriate QoS for the traffic for the new connection. Where the QoS data retrieved from DNS relates to a network, rather than relating to a specific destination address, a marking rule for the network may be installed. Where network-based marking rules are installed, any new connections to the same network may be marked and policed correctly from the moment they are attempted. On detection of a new connection, CPE 10 checks existing entries in the appropriate marking state table 318, 338 for connections or networks. Before querying DNS 140, CPE 10 first searches existing marking rules tables. Alternatively, agent 400 may instructs operating software 420 to make use of a local DNS cache (not shown) compliant with standard DNS caching semantics.

According to a preferred embodiment, the invention may be operated in a deterministic real-time manner and packets for unknown connections queued until an appropriate QoS policy has been retrieved.

QoS data is cached by the DNS 140 using the standard DNS semantics and using DNS Time To Live (TTL) to control caching. This allows intelligent caching at multiple levels—CPE, local DNS servers, central DNS servers, etc. DNS is stateless: this allows the DNS database to be propagated so making it highly available using very low cost means, such as shared anycast DNS as described in IETF RFC 3258 "Distributing Authoritative Name Servers via Shared Unicast Addresses".

The Internet 16 is commonly accessed by a user via a CPE 10 and an access network 14 provided by a telecommunications service provider. Most telecommunication service providers maintain what is known as a "routing registry". This is a centralised repository of network data that is used to generate configuration data for routers and to guide routing, capacity planning and transit-purchase planning decisions. Some telecommunications providers also maintain a high-end QoS policy registry using COPS or some other QoS policy notation.

According to the invention, the data from sources such as a routing registry, a centralised QoS policy registry, etc may be used to generate TXT records for DNS databases specifying QoS parameters for all destinations or networks which are known or deemed to be of interest. Each such TXT record may contain a list of port/QoS-marking or application/QoS-marking pairs and optionally default QoS marking for the network.

For example a telecommunications service provider can specify "EF" (near-real-time priority) for a network used to host its VOIP service. Use of the invention will result in CPEs of users which use this service having a correctly configured QoS mapping each time they use this VOIP service. At the same time CPEs of users which do not use this particular service need not waste resource on storing and maintaining a mapping for it. Advantageously, this approach can allow a telecommunications service provider to maintain any number of mappings for any number of such services but each CPE will map only the ones being used by the user of that CPE.

Similarly, the telecommunications service provider can specify known "dubious" ISPs (e.g. hosting suspected malicious software) into a junk class. It is also possible to specify that traffic with a specific destination address be blocked altogether, e.g. by mapping the traffic to a QoS class with zero bandwidth.

Preferably, the QoS markings should be encoded so they can be parsed and decoded using basic library functions that are commonly present in CPE operating system software, although it is possible to use more complex encodings (e.g. XML).

According to a preferred embodiment, traffic may be marked by overwriting the Differentiated Services Code Point (DSCP) bits in the Differentiated Services (DiffServ) field of the header of the IP packets carrying the traffic. The following are commonly-defined QoS classes (also known as "per-hop behaviours"), although other classes may also be supported:

Default: typically best-effort traffic;
Expedited Forwarding (EF): low-loss, low-latency traffic;
Assured Forwarding (AF): gives assurance of delivery under conditions;
Class Selector: defined to maintain backward compatibility with the IP Precedence field.

Preferably, the retrieval of marking rules is performed in non-real-time. Where retrieval of rules for a connection takes place in the non-real-time scenario, the QoS for a connection may be policed according to current default CPE settings. For most installations this may be equivalent to allowing the traffic to pass through at the default QoS setting.

According to a preferred embodiment, once the marking rules are in place in the state table, CPE 10 may police traffic entering the network using a fixed hierarchy of queues and policers provisioned on CPE 10. Where there is a need to change the queue hierarchy, for example to add a new queue, the change may be performed using the normal provisioning methods such as the TR-069 family of management protocols.

According to a preferred embodiment, the initial rules (i.e. rules used while the rules specific to a connection are being retrieved) provide a "fast start" for new connections/applications (i.e. giving an initially more favourable QoS marking to traffic on a new connection). Advantageously, the invention allows such "fast start" even on networks which have no inherent support for this feature.

It is also possible to operate the invention to control QoS for incoming traffic. In that case the same procedures as above are followed but with marking based on a source address. Instead of marking traffic for the network, CPE 10 can classify traffic in which a specific pre-provisioned bandwidth is allocated to traffic in each QoS class. As a result acceptable QoS and traffic management may be provided for most protocols which support flow control (e.g. TCP).

According to an exemplary embodiment, the marking rules may have the following (simple, non-XML) marking syntax:
[!][destination port|destination startport-endport|application][/protocol][:diffserv]:mark.
in which
[..] indicates an optional field;
"!" preceding the rule signifies "not equal to";
"|" indicates a choice (select one)
"destination port|destination startport-endport|application" denotes a choice of header fields;
"/protocol" denotes the relevant communications protocol, such as IP; and
"diffserv" denotes the "differential services" field in the IP packet header.

A rule with no "port|application" portion may be considered to be a default rule and may be used for any connection that does not match a specific application or port/protocol. A rule with missing "diffserv" may match any type of service.

According to a preferred embodiment, marking rule data may be encoded as above but with different separator symbols in use. According to a preferred embodiment, the marking syntax may be extended to contain control statements to retrieve larger and more complex rule sets which cannot be accommodated in a DNS TXT field. The DNS file may thus comprise a pointer to the location of the QoS data (i.e. an address pointing the location of the QoS data) or even a pointer to a location comprising a further pointer. According to a preferred embodiment, retrieval may be via an alternative method using a Uniform Resource Locator (URI), for example represented using COPS.

Marking rule data may be encoded as above with the marking syntax extended to contain control statements to request a marking directly from a server using a Uniform Resource Locator (URI). Using the example notation shown above a referral may be represented through a record containing the text URI:http://policy.example.com/policy.txt which commands the device to fetch a policy which cannot fit into the record via http.

CPE agent application may query, through operating software 420, names in a domain specific to the telecommunications service provider for the network, thus allowing standard DNS implementations to be used, whilst providing high-availability. Where a connection is established for a network domain specific to a telecommunications service provider, a second address may be created in a special, QoS data network domain specific to a telecommunications provider. The second address may then be used in retrieving QoS data for the connection, thus allowing standard DNS implementations to be used. For example: the TXT record for 32.3.0.113.212.qos.bt.com in domain "qos.bt.com" may be used for QoS data for IP address 212.113.0.3. Similarly, the TXT record for 24.0.0.113.212.qos.bt.com may be used for QoS data for the 212.113.0.0/24 network.

The retrieved QoS data may be distributed via anycast (for example as described in RFC3258) to DNS servers located throughout the data network. In order to keep the retrieved QoS data private, a management network overlay may be used for CPE 10 to retrieve the QoS data The invention has been described with reference to DNS by way of example only. The invention is not restricted to use of DNS but may be implemented using an alternative distributed hierarchical naming system. The QoS data need not be retrieved directly from the DNS but is derived from the DNS either by retrieving directly from a DNS record or by retrieving from a record pointed to (either directly or indirectly) by a DNS record.

The invention has been described with reference to a network CPE by way of example only. The invention is not restricted to use of CPE but may be implemented using an alternative network element. The network element may, as in the case of a CPE, be a border element of a network domain, or as in the case of a router, be an internal element of a network domain. The network element may comprise a connection state store for storing connection state information such as information relating to the state of the connections impinging on the network element. The network element may scan the connection state store to identify an entry corresponding to a new connection impinging on the network element. The marking rule store may be comprised in the connection state store.

Figure 7:
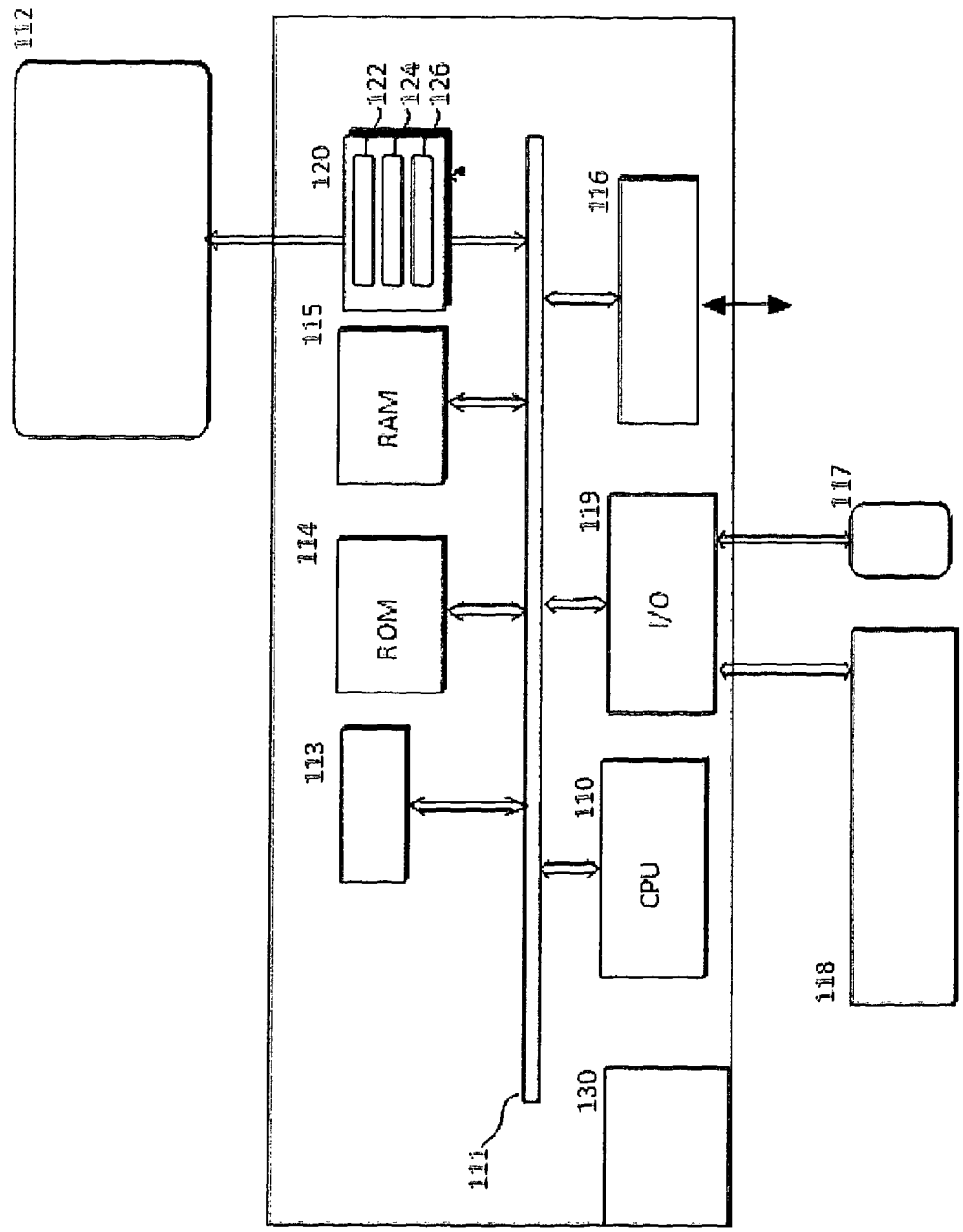
FIG. 7 shows a schematic block diagram of a CPE of the prior art.

A typical architecture for a network element on which software implementing the invention can be run, is shown in FIG. 7. Each network element comprises a central processing unit (CPU) 110 for executing network element programs and managing and controlling the operation of the network element. The CPU 110 is connected to a number of devices via a bus 111 to a variety of devices including non volatile data storage means. The non volatile data storage means may comprise one or more hard disc drives 120; in addition there may be provided removable non volatile data storage means, such as removable hard disc drives or optical media (for example re-writable or recordable DVDs) and solid state memory devices including non-volatile ROM 114 and volatile RAM 115.

The network element further includes network interfaces 116 for interfacing to and exchanging data via user network 12 and access network 14. The network interface(s) may be a local area network (LAN) adaptor connecting to a LAN. The LAN may itself be connected to other LANs and wide area networks (WANs) to enable the apparatus to communicate with and exchange data with other network elements. Alternatively, the network interface may be a DSL modem, or similar, that provides a connection to a WAN, such as the internet or an intranet, which enables communications with further networks.

The network element can also, optionally, include user input/output devices such as a mouse 117 and keyboard 118 connected to the bus 111 via input/output port 119, as well as a display 112. The network element is powered by power supply unit 130, typically obtaining power from an external power grid or internal battery (not shown). The skilled person will understand that this architecture is not limiting, but is merely an example of typical network element architecture. The network element may also be a distributed system, comprising a number of network elements communicating through their respective interface ports 116 such that a user may access program and other data stored on a remote network element using user interface devices 117, 118, 112 on their local network element.

Non volatile data storage means 120 comprises an operating system 122 and one or more application programs 124. Operating system 122 comprises the software that the computing apparatus requires to operate, communicate with other network elements, receive input from users, display outputs and results to users, etc. Application programs 124 can be executed by the apparatus in order to provide additional functionality. Non volatile data storage means 120 further comprises network element code 126 which can be executed in order to perform a method according to the present invention, for example such as the one described above and illustrated in the drawings. It will be understood that network element code 126 may comprise a single integrated application, or a number of different modules that are accessed separately to execute a method according to the present invention. Each module may perform the functionality of one or more of the processes which comprise the present invention.

The above embodiments are to be understood as illustrative examples of the invention. It is to be understood that any feature described in relation to any one embodiment may be used alone, or in combination with other features described, and may also be used in combination with one or more features of another of the embodiments, or any combination of the embodiments. Further embodiments of the invention are envisaged and will be evident to the skilled reader. Furthermore, equivalents and modifications not described above may also be employed without departing from the scope of the invention, which is defined in the accompanying claims.

As will be understood by those skilled in the art, the invention may be implemented in computer program product software, any or all of which may be contained on various storage media so that the program can be loaded onto one or more computing devices (such as shown in FIG. 7) or could be downloaded over a computer network using a suitable transmission medium. The computer program product software used to implement the invention may be embodied on any suitable carrier, readable by a suitable computer input device (not shown), such computer program product comprising optically, magnetically or otherwise readable marks.

Advantages of the Invention

The invention enables CPEs in a telecommunications provider network to perform functions supplanting expensive DPI equipment deployed further into the network and so removing the need to divert traffic to a, possibly remote, DPI control point. In doing so, the invention reduces both cost and network traffic and increases network design options considerably. The advantage is illustrated by comparing FIGS. 1 and 3.

In particular, the invention provides QoS provisioning at customer premises equipment in a manner that is simple, scalable, highly available, flexible and cost effective. The invention may remove the need for marking traffic for QoS within a network by moving this activity to the network edge. The invention may also support low cost Denial Of Service mitigation and network admission control in residential networks.

The method is well suited to use in broadband networks where few if any of the CPEs have the processing capability needed to support a comprehensive network QoS policy and is scalable to tens of millions of controlled devices.

The invention may improve the user experience with QoS provisioning for Voice over IP (VOIP) and Video on Demand (VOD), mitigate detrimental effects resulting from Peer-to-Peer (P2P) traffic and improve network utilisation including but not limited to capacity optimization based on different QoS levels of traffic.

Although described above with reference to IP, the invention maybe applied to a wide range of communications technologies that support quality of service marking, including but not limited to, IP Differentiated services (DiffServ), IP Integrated services (IntServ), Resource Reservation Protocol (RSVP, RSVP-TE), Multiprotocol Label Switching (MPLS), Frame relay, X.25, Asynchronous Transfer Mode (ATM), IEEE 802.1p, IEEE 802.1Q and IEEE 802.11e.

What is claimed is:

1. A method for marking traffic in a packet-switched data network, in which the packet-switched data network comprises a distributed hierarchical naming system and customer premises equipment;
    in which the customer premises equipment comprises a marking rule store for storing marking rules, in which each marking rule is indicative of a quality of service level allocated to a connection impinging on the customer premises equipment;
    in which the method comprises:
    deriving from the distributed hierarchical naming system quality of service data for a connection;
    storing in the marking rule store a marking rule for the connection based on the derived quality of service data; and
    marking traffic on the connection in accordance with the marking rule;
    in which the quality of service data for the connection comprises quality of service data corresponding to at least one network of the connection, in which an address of the connection comprises a series of address bits arranged in order of significance from a least significant bit position to a most significant bit position, in which the method comprises:
    sending a series of queries in succession to the distributed hierarchical naming system to derive quality of service data corresponding to at least one network of the connection; in which each one of the series of successive queries is associated with a masked form of the address of the connection;
    in which each masked form of the address comprises a series of contiguous address bits that occurs in the address of the connection and a series of contiguous masked bits set to a common value;
    in which the series of contiguous masked bits comprises the least significant address bit position and the series of contiguous address bits comprises the most significant bit position,
    in which each subsequent query in the series is associated with a masked form of the address of the connection which comprises more masked bits and a correspondingly lower number of the address bits occurring in the address of the connection when compared with the masked form of the address with which the immediately previous query in the series is associated;
    in which the method further comprises:
    terminating the series of queries upon receipt from the distributed hierarchical naming system of an indication indicating that the most recent query of the series relates to a valid address
    selecting the quality of service data derived in response to the most recent query of the series of queries;
    based on the selected quality of service data, storing in the marking rule store a marking rule for the network corresponding to the most recent query; and
    marking traffic on the connection in accordance with the marking rule.

2. A method for marking traffic in a packet-switched data network, in which the packet-switched data network comprises a distributed hierarchical naming system and customer premises equipment;
    in which the customer premises equipment comprises a marking rule store for storing marking rules, in which each marking rule is indicative of a quality of service level allocated to a connection impinging on the customer premises equipment;
    in which the method comprises:
    deriving from the distributed hierarchical naming system quality of service data for a connection;
    storing in the marking rule store a marking rule for the connection based on the derived quality of service data; and
    marking traffic on the connection in accordance with the marking rule;
    in which the quality of service data for the connection comprises quality of service data corresponding to at least one network of the connection, in which an address of the connection comprises a series of address bits arranged in order of significance from a least significant bit position to a most significant bit position, in which the method comprises:
    sending a series of queries in succession to the distributed hierarchical naming system to derive quality of service data corresponding to at least one network of the connection; in which each one of the series of successive queries is associated with a masked form of the address of the connection;
    in which each masked form of the address comprises a series of contiguous address bits that occurs in the address of the connection and a series of contiguous masked bits set to a common value;
    in which the series of contiguous masked bits comprises the least significant address bit position and the series of contiguous address bits comprises the most significant bit position;
    in which each subsequent query in the series is associated with a masked form of the address of the connection which comprises fewer masked bits and a correspondingly higher number of the address bits occurring in the address of the connection when compared with the masked form of the address with which the immediately previous query in the series is associated;

in which the method further comprises:

terminating the series of queries upon receipt from the distributed hierarchical naming system of an indication indicating that the most recent query of the series relates to a nonexistent domain;

selecting the quality of service data derived in response to the penultimate query of the series of queries;

based on the selected quality of service data, storing in the marking rule store a marking rule for the network corresponding to the penultimate query; and marking traffic on the connection in accordance with the marking rule.

* * * * *